(12) United States Patent
Chang et al.

(10) Patent No.: US 10,446,961 B1
(45) Date of Patent: Oct. 15, 2019

(54) ELECTRICAL CONNECTOR SET WITH MULTI ELECTRICAL-CONNECTION DIRECTIONALITY

(71) Applicants: SOLTEAM ELECTRONICS CO., LTD., Taoyuan (TW); KWANG YANG MOTOR CO., LTD., Kaohsiung (TW)

(72) Inventors: Chun-Yun Chang, Taoyuan (TW); Ying-Sung Ho, Taoyuan (TW); Ta-Feng Yeh, Taoyuan (TW); Cheng-Wei Lu, Taoyuan (TW); Wei-Chen Wang, Taoyuan (TW); Jen-Chieh Cheng, Kaohsiung (TW)

(73) Assignees: SOLTEAM ELECTRONICS CO., LTD., Taoyuan (TW); KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 16/237,347

(22) Filed: Dec. 31, 2018

(30) Foreign Application Priority Data

May 15, 2018 (TW) .............................. 107206321 U

(51) Int. Cl.
| | |
|---|---|
| *H01R 24/86* | (2011.01) |
| *H01R 13/05* | (2006.01) |
| *B60R 16/033* | (2006.01) |
| *H01R 13/40* | (2006.01) |
| *H01R 24/38* | (2011.01) |

(Continued)

(52) U.S. Cl.
CPC ......... *H01R 13/052* (2013.01); *B60R 16/033* (2013.01); *H01R 13/40* (2013.01); *H01R 13/52* (2013.01); *H01R 13/627* (2013.01); *H01R 13/639* (2013.01); *H01R 24/38* (2013.01)

(58) Field of Classification Search
USPC ...................................................... 35/35, 675
See application file for complete search history.

(56) References Cited

U.S. PATENT DOCUMENTS

| | | | |
|---|---|---|---|
| 5,626,479 A * | 5/1997 | Hughes .................... | B60D 1/62 439/35 |
| 6,447,302 B1 * | 9/2002 | Davis ..................... | H01R 29/00 439/34 |

(Continued)

*Primary Examiner* — Neil Abrams
(74) *Attorney, Agent, or Firm* — Anova Law Group, PLLC

(57) ABSTRACT

Disclosures of the present invention mainly describe an electrical connector set mainly consisting of a space-end electrical connector disposed in a battery accommodating space and a battery-end electrical connector connected to a replaceable battery. The space-end electrical connector is integrated with a first outer circular cylinder member and a first inner circular cylinder member therein. In contrast to the space-end electrical connector, the battery-end electrical connector is also provided with a second outer circular cylinder member and a second inner circular cylinder member therein. By such arrangement, after connecting the battery-end electrical connector with the space-end electrical connector, the outer wall of the first outer circular cylinder member contacts with a circular negative electrode of the second outer circular cylinder member and the outer wall of the first inner circular cylinder member contacts with the circular positive electrode of the second inner circular cylinder member.

18 Claims, 9 Drawing Sheets

(51) Int. Cl.
   *H01R 13/627* (2006.01)
   *H01R 13/639* (2006.01)
   *H01R 13/52* (2006.01)

(56) References Cited

U.S. PATENT DOCUMENTS

| | | | | |
|---|---|---|---|---|
| 6,814,581 B2 * | 11/2004 | Matsuo | ............... | H01R 13/5202 |
| | | | | 439/35 |
| 6,923,688 B1 * | 8/2005 | Burson | ............... | H01R 13/2421 |
| | | | | 439/218 |
| 7,491,065 B2 * | 2/2009 | Wagner | ............... | H01R 13/5213 |
| | | | | 439/35 |
| 7,927,108 B2 * | 4/2011 | Gong | ................ | H01R 13/7031 |
| | | | | 439/63 |
| 8,079,878 B2 * | 12/2011 | Huang | ................... | H01R 24/30 |
| | | | | 439/660 |
| 8,376,758 B2 * | 2/2013 | Sell | ......................... | B60D 1/64 |
| | | | | 439/34 |
| 8,435,078 B2 * | 5/2013 | Hsueh | ................... | H01R 24/86 |
| | | | | 439/660 |
| 8,465,300 B2 * | 6/2013 | Lin | ....................... | H01R 24/86 |
| | | | | 439/101 |
| 9,463,702 B2 * | 10/2016 | Fukushima | .......... | H01R 13/506 |
| 9,793,621 B2 * | 10/2017 | Kumar | ..................... | H01R 4/58 |
| 9,917,389 B2 * | 3/2018 | Markefka | ............... | H01R 13/05 |
| 9,966,713 B1 * | 5/2018 | Shaeffer | ................. | H01R 24/86 |

\* cited by examiner

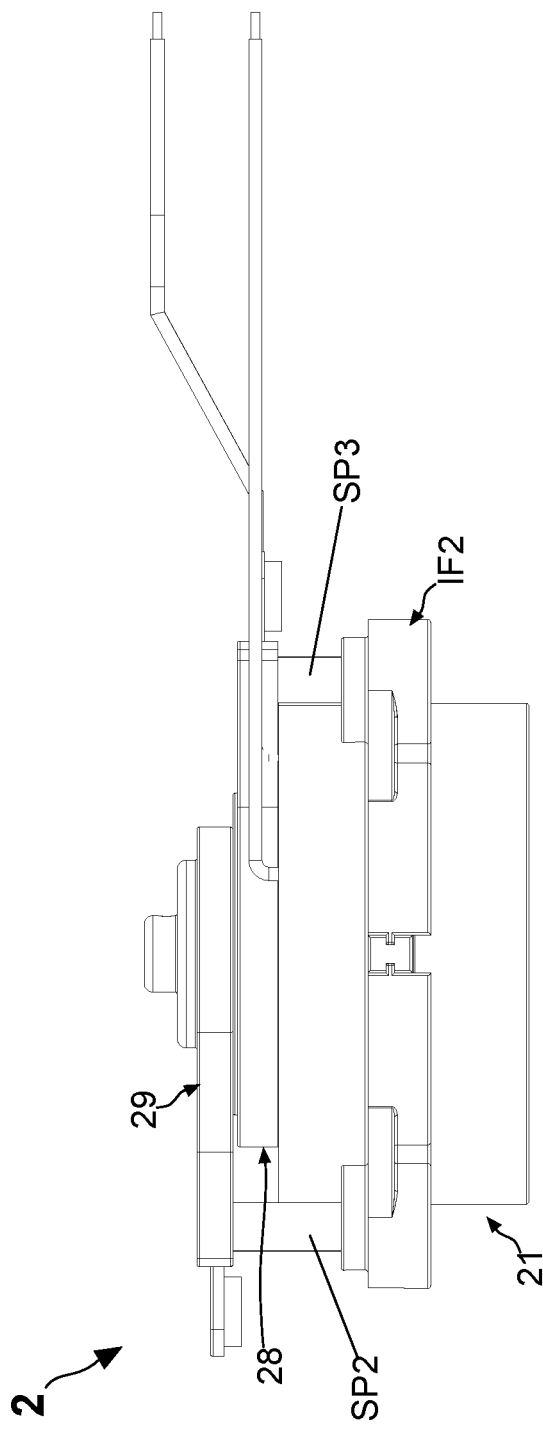

US 10,446,961 B1

ELECTRICAL CONNECTOR SET WITH MULTI ELECTRICAL-CONNECTION DIRECTIONALITY

BACKGROUND OF THE INVENTION

1. Field of the Invention

The present invention relates to the technology field of electrical connectors, and more particularly to an electrical connector set with multi electrical-connection directionality for use in electric vehicles.

2. Description of the Prior Art

Research, development and promotion of electric cars and electric motorcycles have been included into national development plan by most of advanced countries. Moreover, with the advance of the electricity storage technology of batteries, famous automobile factories all involve in the development and manufacture of various electric vehicles, thereby proposing pilot products of electric car and/or electric motorcycle. People having the experience of driving the electric car and/or the electric motorcycle should know that, it needs to find a battery charging station for the electricity charging of a battery unit in the electric car and/or the electric motorcycle in the case of the battery unit being coming to run out of the electricity thereof. It is extrapolated that, such battery charging model cause people have a low willingness to purchase a personal electric vehicle.

Accordingly, for enhancing the electric motorcycle purchasing willingness of people, manufactures all implement a self-replaceable battery system in their electric motorcycles so as to provide a better and convenient battery charging model to those electric motorcycle owners. FIG. 1 shows a diagram for depicting a battery replacing operation in an electric motorcycle. From FIG. 1, it is understood that the above-mentioned self-replaceable battery system comprises a motorcycle battery 1' and a power management module 21' disposed in a battery accommodating space 2' of the electric motorcycle, wherein the motorcycle battery 1' is provided with a handle 11' and a battery-end electrical connector 11' thereon. After the motorcycle battery 1' is inserted into the battery accommodating space 2', an electrical connection between the battery-end electrical connector 11' and a recess-end electrical connector 22' disposed in the battery accommodating space 2' is therefore established, such that the power management module 21' is configured to control the motorcycle battery 1' to supply power to the electric motorcycle.

It is worth further explaining that, the above-motioned self-replaceable battery system is also implemented in a self-replaceable battery charging station establish by the electric motorcycle manufacture. Briefly speaking, the self-replaceable battery charging station comprises a plurality of battery accommodating space for receiving multi motorcycle batteries 1' at the same time, therefore the motorcycle batteries 1' are charged under the controlling of the power management module 21' disposed in the self-replaceable battery charging station. By applying the self-replaceable battery system in both of the electric motorcycle and the battery charging station, not only do the electric motorcycle owner be allowed to charge the motorcycle battery by himself, but also he is able to replace the used motorcycle battery by any one un-use motorcycle battery taking from the battery accommodating spaces of the self-replaceable battery charging station. Obviously, self-replaceable battery charging model is a better and more convenient battery charging model compared to the traditional battery charging model.

It is worth considering that, there is a limited or specific electrical-connection directionality existing between the battery-end electrical connector 11' and the recess-end electrical connector 22' due to the particular design of the electrical terminals of the two connectors. However, the electric motorcycle owner can achieve the limited electrical-connection directionality only if a setting flow is repeated at least one time. The setting flow comprising steps of: (1) inserting the motorcycle battery 1' into the accommodating space 2', (2) pulling the motorcycle battery 1' out of the accommodating space 2', (3) turning the motorcycle battery 1' by an angle, and (4) inserting the motorcycle battery 1' into the accommodating space 2' again.

From above descriptions, it is clear that how to design and manufacture an electrical connector set comprising a battery-end electrical connector and a recess-end electrical connector without the above described limited electrical-connection directionality has become an important issue. In view of that, inventors of the present application have made great efforts to make inventive research and eventually provided an electrical connector set with multi electrical-connection directionality for use in electric vehicles.

SUMMARY OF THE INVENTION

The primary objective of the present invention is to disclose an electrical connector set (ME) with multi electrical-connection directionality for use in electric vehicles, comprising a space-end electrical connector (1) disposed in a battery accommodating space (41) and a battery-end electrical connector (2) connected to a replaceable battery (3). Particularly, a first signal transmitting terminal (14) and a second signal transmitting terminal (24) are provided in the electrical connector set (ME) for being as two primary signal terminals, and there are multi first signal transmitting members (15) and second signal transmitting members (25) provided in the electrical connector set (ME) for being as extending or auxiliary signal terminals. It is worth particularly mentioning that, the space-end electrical connector (1) is integrated with a first outer circular cylinder member (12) and a first inner circular cylinder member (13) therein. In contrast to the space-end electrical connector (1), the battery-end electrical connector (2) is also provided with a second outer circular cylinder member (22) and a second inner circular cylinder member (23) therein. By such arrangement, after connecting the battery-end electrical connector (2) with the space-end electrical connector (1), the outer wall of the first outer circular cylinder member (12) contacts with a circular negative electrode (NC) of the second outer circular cylinder member (22), the outer wall of the first inner circular cylinder member (13) contacts with the circular positive electrode (PC) of the second inner circular cylinder member (23), and each of first contact ends (151) of the first signal transmitting members (15) contact with each of second contact ends (251) of the second signal transmitting members (25). It is noted that, the user can directly insert the replaceable battery (3) into the battery accommodating space (41) by completing one-pass connection of the battery-end electrical connector (2) and the space-end electrical connector (1), without needing to turn over or rotate the replaceable battery (3).

In order to achieve the primary objective of the present invention, the inventor of the present invention provides an embodiment for the electrical connector set (ME) with multi electrical-connection directionality, which is applied between a replaceable battery (3) and a battery accommodating space (41), and comprises:

a space-end electrical connector (1), being disposed in the battery accommodating space (41), and comprising:
- a first insulation body (11);
- a first outer circular cylinder member (12), being embedded in the first insulation body (11), and respectively protruding out of the top side and the bottom side of the first insulation body (11) by the top end and the lower end thereof;
- a first inner circular cylinder member (13), being embedded in the first insulation body (11) and locating in the first outer circular cylinder member (12), and respectively protruding out of the top side and the bottom side of the first insulation body (11) by the top end and the lower end thereof;
- a first signal transmitting terminal (14), being embedded in the first insulation body (11) and locating in the first inner circular cylinder member (13), and respectively protruding out of the top side and the bottom side of the first insulation body (11) by the top end and the lower end thereof;
- a plurality of first signal transmitting members (15), being embedded in the first insulation body (11) and having a first contact end (151) and a first insertion end (152); wherein the first contact end (151) and the first insertion end (152) protrude out of the top side and the bottom side of the first insulation body (11), respectively;
- a first PCB (16), being connected to the first insertion ends (152) of the plurality of first signal transmitting members (15) through the bottom side of the first insulation body (11); and
- a plurality of first signal transmitting wires (17), being connected to the first PCB (16) by one end thereof, thereby electrically connecting to the plurality of first signal transmitting members (15), respectively; and a battery-end electrical connector (2), being connected to the replaceable battery (3), and comprising:
- a second insulation body (21);
- a second outer circular cylinder member (22), being embedded in the second insulation body (21) and provided with a circular negative electrode (NC) on the inner wall thereof, and respectively protruding out of the top side and the bottom side of the second insulation body (21) by the top end and the lower end thereof;
- a second inner circular cylinder member (23), being embedded in the second insulation body (21) and locating in the second outer circular cylinder member (22); wherein the inner circular cylinder member (23) is provided with a circular positive electrode (PC) on the inner wall thereof, and respectively protruding out of the top side and the bottom side of the second insulation body (21) by the top end and the lower end thereof;
- a second signal transmitting terminal (24), being disposed in the second positive electrode supporting member (23), and respectively protruding out of the top side and the bottom side of the second insulation body (21) by the top end and the lower end thereof;
- a plurality of second signal transmitting members (25), being embedded in the second insulation body (21) and having a second contact end (251) and a second insertion end (252); wherein the second contact end (251) and the second insertion end (252) protrude out of the top side and the bottom side of the second insulation body (21), respectively;
- a second PCB (26), being connected to the second insertion ends (252) of the plurality of second signal transmitting members (25) through the bottom side of the second insulation body (21); and a plurality of second signal transmitting wires (27), being connected to the second PCB (26) by one end thereof, thereby electrically connecting to the plurality of second signal transmitting members (25), respectively;

wherein by connecting the battery-end electrical connector (2) with the space-end electrical connector (1), the outer wall of the first outer circular cylinder member (12) contacting with the circular negative electrode (NC) of the second outer circular cylinder member (22), the outer wall of the first inner circular cylinder member (13) contacting with the circular positive electrode (PC) of the second inner circular cylinder member (23), and each of the first contact ends (151) of the plurality of first signal transmitting members (15) contacting with each of the second contact ends (251) of the plurality of second signal transmitting members (25).

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein:

FIG. 11 shows a side view of the battery-end electrical connector.

DETAILED DESCRIPTION OF THE PREFERRED EMBODIMENTS

To more clearly describe an electrical connector set with multi electrical-connection directionality, embodiments of the present invention will be described in detail with reference to the attached drawings hereinafter.

Figure 2:
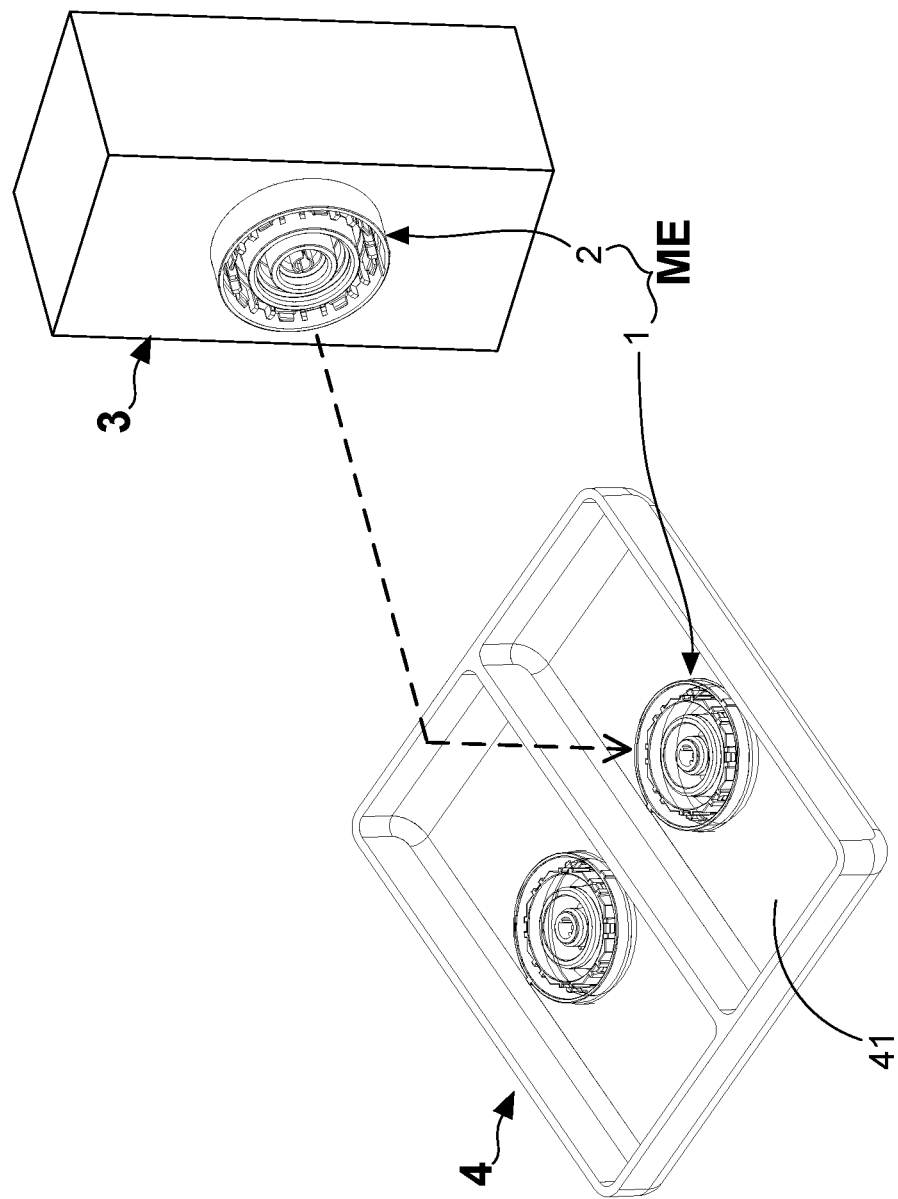
FIG. 2 shows a diagram for depicting the practical application of an electrical connector set with multi electrical-connection directionality according to the present invention.
Figure 3:
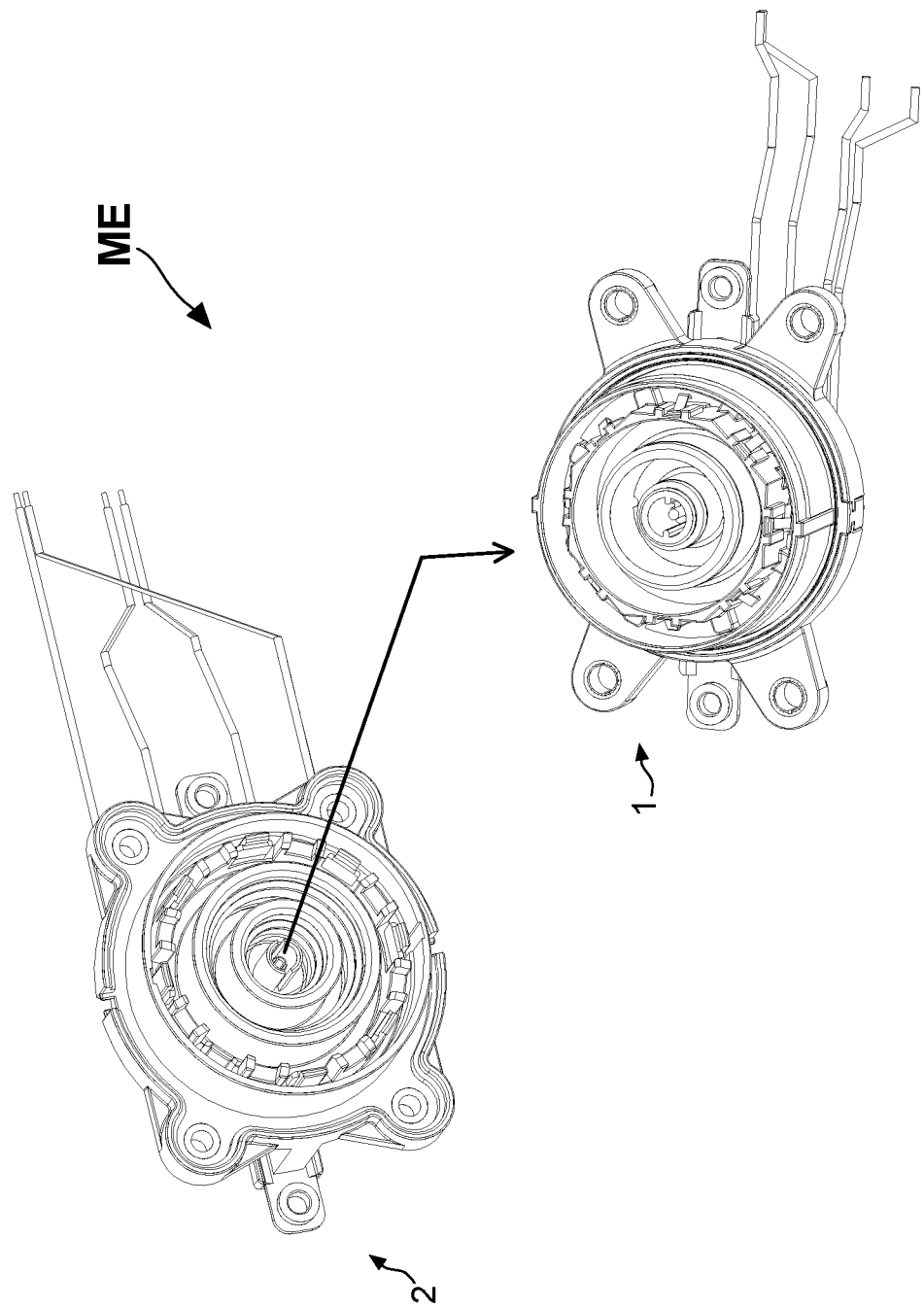
FIG. 3 shows a stereo diagram of the electrical connector set with multi electrical-connection directionality.

With reference to FIG. 2, there is provided a diagram for depicting the practical application of an electrical connector set with multi electrical-connection directionality according to the present invention. Moreover, FIG. 3 shows a stereo diagram of the electrical connector set with multi electrical-connection directionality. This electrical connector set ME is applied between a replaceable battery 3 and a battery accommodating space 41, and mainly comprises a space-end electrical connector 1 disposed in the battery accommodating space 41 and a battery-end electrical connector 2 connected to the replaceable battery 3. Although FIG. 2 depicts that the space-end electrical connector 1 is disposed in the battery accommodating space 41 of a storage compartment belong to an electric motorcycle, the battery accommodating space 41 can also come from one of a plurality of battery accommodating spaces belong to a self-replaceable battery charging station.

Construction and Constituting Elements of the Space-End Electrical Connector

Figure 4:
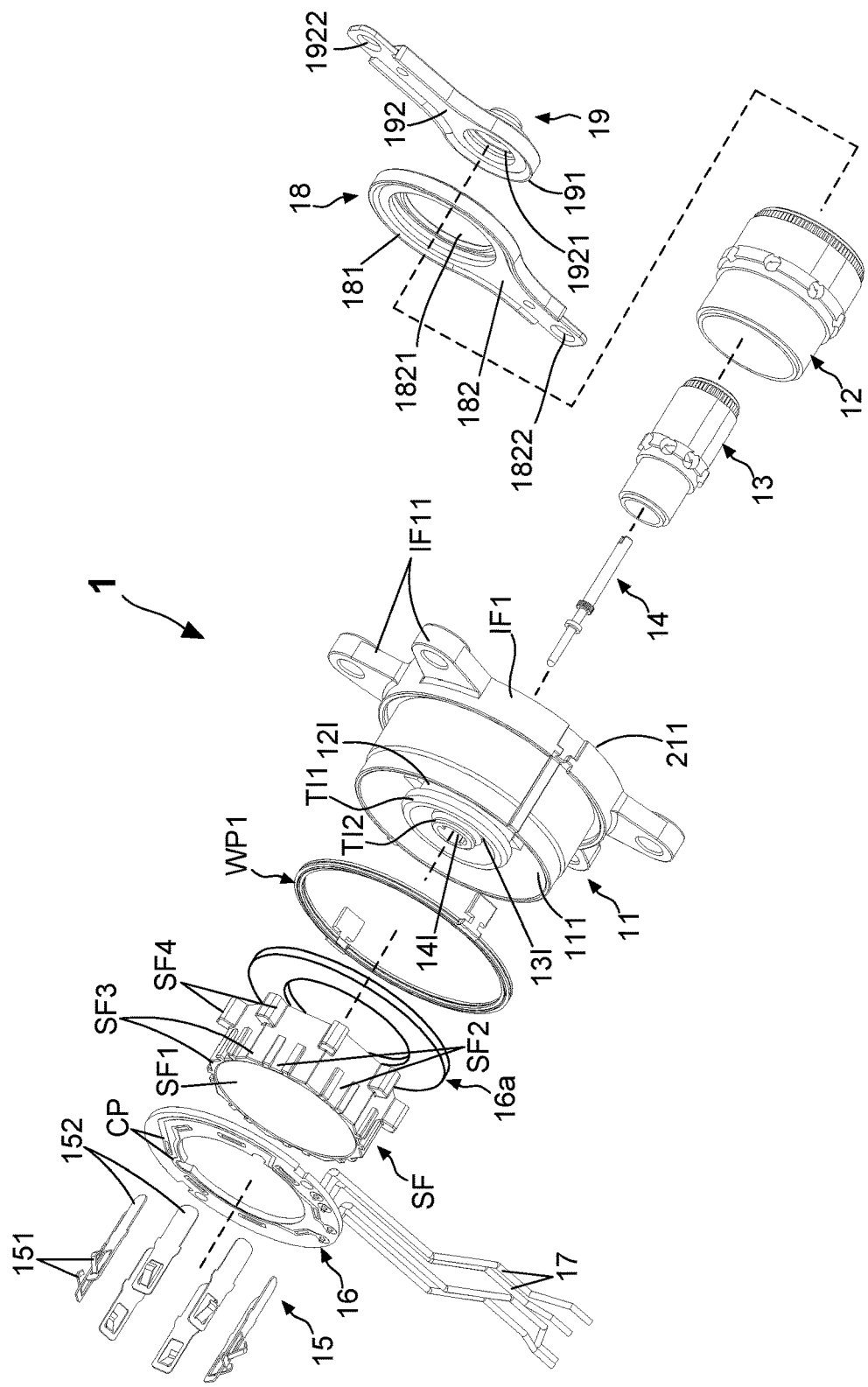
FIG. 4 shows a stereo exploded view of a space-end electrical connector of the electrical connector set.

Referring to FIG. 2 and FIG. 3 again, and please simultaneously refer to FIG. 4, which illustrates a stereo exploded view of the space-end electrical connector. According to the particular design of the present invention, the space-end electrical connector 1 mainly comprises: a first insulation body 11, a first outer circular cylinder member 12, a first inner circular cylinder member 13, a first signal transmitting terminal 14, a plurality of first signal transmitting members 15, a first PCB 16, a plurality of first signal transmitting wires 17, a first negative electrode connecting unit 18, and a first positive electrode connecting unit 19. The first outer circular cylinder member 12, the first inner circular cylinder member 13, the first signal transmitting terminal 14 are embedded in the first insulation body 11 with the injection molding of the first insulation body 11. From FIG. 4, it is able to find that each of the first outer circular cylinder member 12 and the first inner circular cylinder member 13 are provided with a plurality of molding injection passages therein. Moreover, FIG. 4 also depicts that the first insulation body 11 particularly comprises a first molded circular cylinder member 12I, a second molded circular cylinder member 13I and a third molded circular cylinder member 14I. In which, the first molded circular cylinder member 12I is disposed in the first outer circular cylinder member 12 for supporting the inner wall of the first outer circular cylinder member 12, the second molded circular cylinder member 13I is disposed in the first inner circular cylinder member 13 so as to support the inner wall of the first outer circular cylinder member 13, and the third molded circular cylinder member 14I is disposed in the second molded circular cylinder member 13I for accommodating the first signal transmitting terminal 14.

Figure 5:
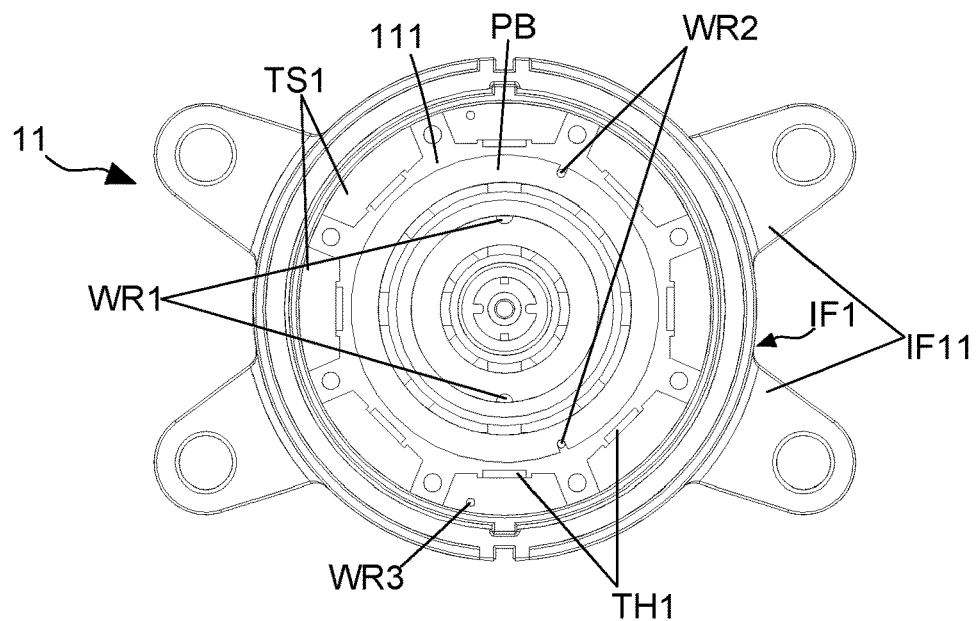
FIG. 5 shows a top view of a first insulation body of the space-end electrical connector.
Figure 6:
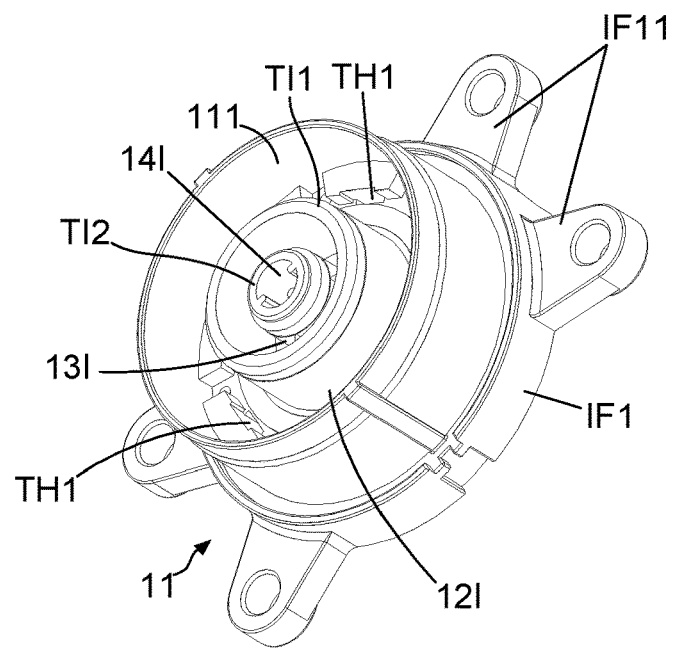
FIG. 6 shows a stereo diagram of the first insulation body.

FIG. 5 and FIG. 6 show a top view and a stereo view of the first insulation body, respectively. In the present invention, a first recess 111 and a second recess 112 are respectively formed on the top side and the bottom side of the first insulation body 11, such that the first outer circular cylinder member 12 embedded in the first insulation body 11 protrudes out of the first recess 111 and the second recess 112 by the top end and the lower end thereof. The first molded circular cylinder member 12I also protrudes out of the first recess 111 and the second recess 112 by the top end and the lower end thereof. On the other hand, the first inner circular cylinder member 13 embedded in the first insulation body 11 is also located in the first outer circular cylinder member 12, so as to protrude out of the first recess 111 and the second recess 112 by the top end and the lower end thereof. The second molded circular cylinder member 13I also protrudes out of the first recess 111 and the second recess 112 by the top end and the lower end thereof. In addition, the first signal transmitting terminal 14 is also embedded in the first insulation body 11 and located in the first inner circular cylinder member 13, wherein the top end and the lower end of the first signal transmitting terminal 14 protrude out of the first recess 111 and the second recess 112, respectively.

There are a plurality of first through holes TH1 and a circular protrusion block PB further provided in the first recess 111, wherein the first through holes TH1 are adopted for making the plurality of first signal transmitting members 15 pass through the first recess 111. Moreover, a plurality of first supporting members TS1 are provided in the first recess 111 for being adjacent to the plurality of first through holes TH1, respectively. The present invention particularly disposed a supporting frame SF in the first recess 111 of the space-end electrical connector 1. The supporting frame SF comprises a frame SF1, a plurality of supporting portions SF2, a plurality of embedding portions SF3, and a plurality of fixing portions SF4. As the diagrams show, frame SF1 is disposed in the first recess 111 and located between the plurality of first supporting members TS1 and the plurality of first through holes TH1. Moreover, the frame SF1 is also located between the plurality of first supporting members TS1 and the circular protrusion block PB. On the other hand, the plurality of supporting portions SF2 are formed on the frame SF1, used for supporting the plurality of first signal transmitting members 15, respectively. In addition, the plurality of embedding portions SF3 are formed on the frame SF1, such that each of the plurality of embedding portions SF3 is located between two of the supporting portions SF2. The diagrams also depict that the plurality of fixing portions SF4 are formed on the frame SF1, adopted for fixing the frame SF1 in the first recess 111 in combination with a plurality of screwing members.

On the other hand, the first PCB 16 is disposed in the second recess 112 of the first insulation body 11 so as to connected to first insertion ends 152 of the plurality of first signal transmitting members 15. Moreover, the first PCB 16 is further covered by an insulation plate 16a. It is worth noting that, there is a distributed circuit pattern CP formed on the first PCB 16, so as to make each two or more of the first signal transmitting members 15 electrically connect to each other through the distributed circuit pattern CP. FIG. 3 and FIG. 4 also depict that the plurality of first signal transmitting wires 17 are connected to the first PCB 16 by one end thereof, thereby electrically connecting to the plurality of first signal transmitting members 15, respectively.

Figure 7:
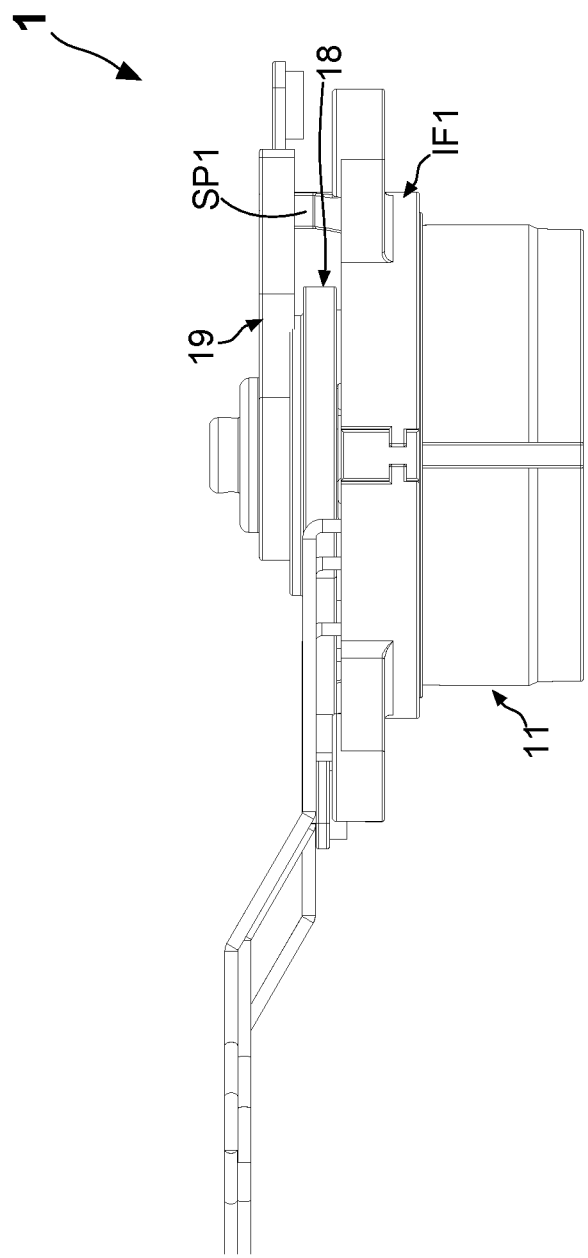
FIG. 7 shows a side view of the space-end electrical connector.

FIG. 7 illustrates a side view of the space-end electrical connector. From the present diagrams, it can find that the first negative electrode connecting unit 18 is one electrical extending member for the first outer circular cylinder member 12, and the first positive electrode connecting unit 19 is another one electrical extending member for the first inner circular cylinder member 13. According the particular design of the present invention, the first negative electrode connecting unit 18 comprises a first electrical connection member 182 and a first insulation member 181 for covering the first electrical connection member 182. Moreover, the first electrical connection member 182 has a first connecting portion 1821 for connecting to the lower end of the first outer circular cylinder member 12 and a second connecting portion 1822 for connecting to an external device. On the other hand, the first positive electrode connecting unit 19 comprises a second electrical connection member 192 and a second insulation member 191 for covering the second electrical connection member 192. Moreover, the second electrical connection member 192 has a third connecting portion 1921 for connecting to the lower end of the first inner circular cylinder member 13 and a fourth connecting portion 1922 for connecting to the external device.

In addition, an insulation body fixing member IF1 having a plurality of flanges IF11 with a fixing hole is further connected to the first insulation body 11, so as to make the space-end electrical connector 1 able to be easily attached onto an object such as the battery accommodating space 41 formed in a storage compartment belong to an electric motorcycle. For instance, FIG. 7 shows that the first positive electrode connecting unit 19 is disposed on the first negative electrode connecting unit 18 so as to be connected to the lower end of the first inner circular cylinder member 13. In this case, at least one supporting post SP1 is arranged between the second electrical connection member 192 and the insulation body fixing member IF1 for maintaining the horizontal stability of the first positive electrode connecting unit 19.

Construction and Constituting Elements of the Battery-End Electrical Connector

Figure 8:
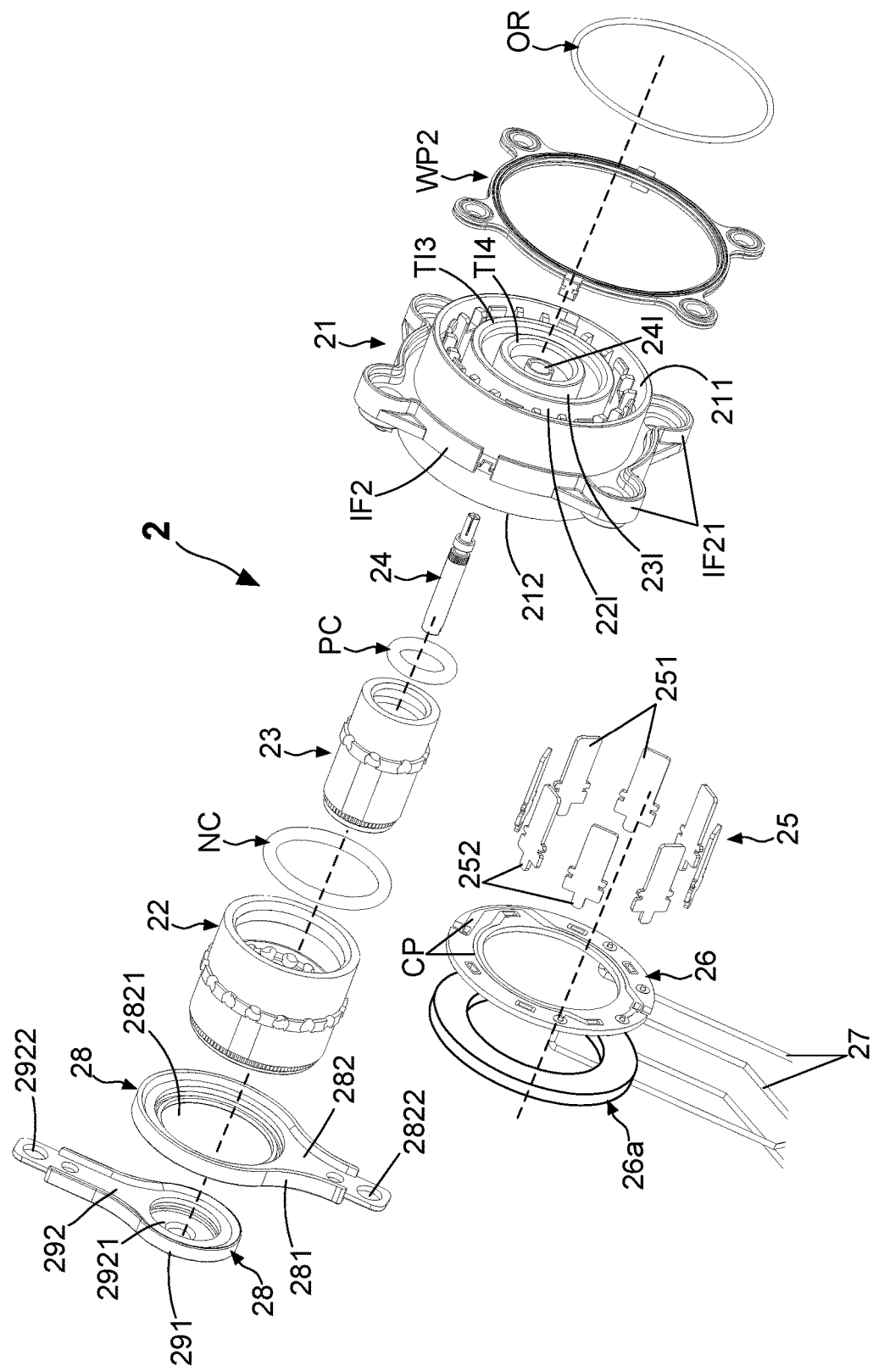
FIG. 8 shows a stereo exploded view of a battery-end electrical connector of the electrical connector set.

Referring to FIG. 2 and FIG. 3 again, and please simultaneously refer to FIG. 8, which illustrates a stereo exploded view of the battery-end electrical connector. According to the particular design of the present invention, the battery-end electrical connector 2 mainly comprises: a second insulation body 21, a second outer circular cylinder member 22, a second inner circular cylinder member 23, a second signal transmitting terminal 24, a plurality of second signal transmitting members 25, a second PCB 26, a plurality of second signal transmitting wires 27, a second negative electrode connecting unit 28, and a second positive electrode connecting unit 29. The second outer circular cylinder member 22, the second inner circular cylinder member 23, the second signal transmitting terminal 24 are embedded in the second insulation body 21 with the injection molding of the second insulation body 21. From FIG. 8, it is able to find that each of the second outer circular cylinder member 22 and the second inner circular cylinder member 23 are provided with a plurality of molding injection passages therein. Moreover, FIG. 8 also depicts that the second insulation body 21 particularly comprises a fourth molded circular cylinder member 22I, a fifth molded circular cylinder member 23I and a sixth molded circular cylinder member 24I.

Figure 9:
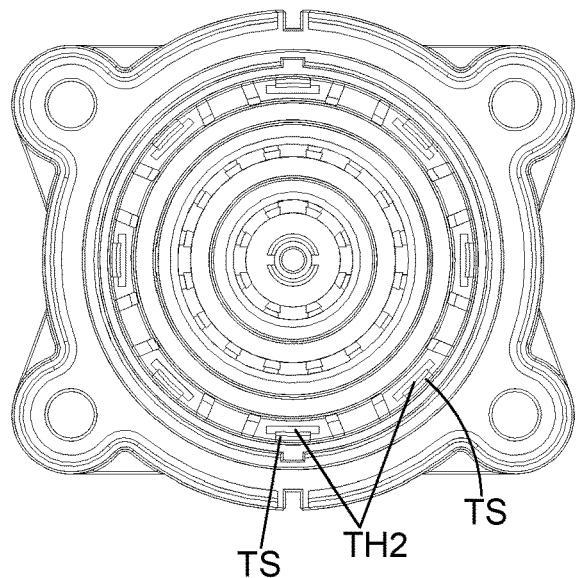
FIG. 9 shows a top view of a second insulation body of the battery-end electrical connector.
Figure 10:
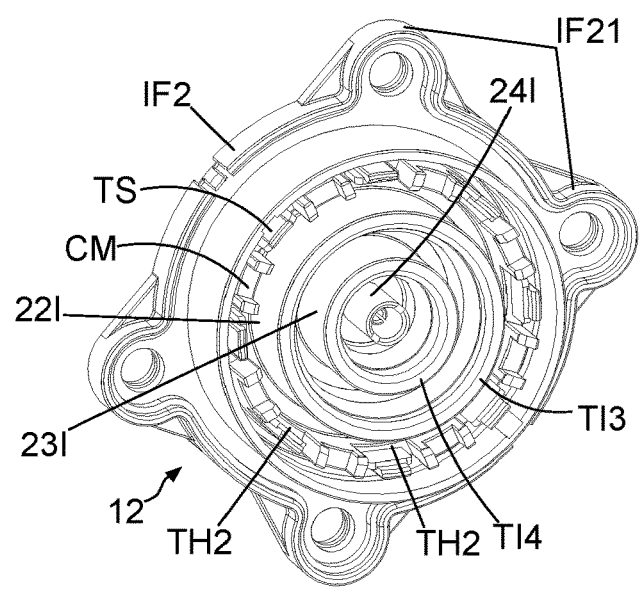
FIG. 10 shows a stereo diagram of the second insulation body.

Continuously referring to FIG. 2, FIG. 3 and FIG. 8, and please simultaneously refer to FIG. 9 and FIG. 10, which respectively show a top view and a stereo view of the second insulation body. According to the particular design of the present invention, the fourth molded circular cylinder member 22I is disposed in the second outer circular cylinder member 22 for supporting the inner wall of the second outer circular cylinder member 22, the fifth molded circular cylinder member 23I is disposed in the second inner circular cylinder member 23 so as to support the inner wall of the second outer circular cylinder member 23, and the sixth molded circular cylinder member 24I is disposed in the fifth molded circular cylinder member 23I for accommodating the second signal transmitting terminal 24. For making this electrical connector set ME be able to have a high voltage (>60V) application, as FIG. 4 shows, the present invention particularly forms a first insulation portion TI1 on the top end of the first molded circular cylinder member 12I for shielding the top end of the first outer circular cylinder member 12. In contrast to the first molded circular cylinder member 12I, the top end of the second molded circular cylinder member 13I is formed with a second insulation portion TI2 for shielding the top end of the first inner circular cylinder member 13. On the other hand, as FIG. 8 shows, the present invention also form a third insulation portion TI3 on the top end of the fourth molded circular cylinder member 22I for shielding the top end of the second outer circular cylinder member 22. In contrast to the fourth molded circular cylinder member 22I, the top end of the fifth molded circular cylinder member 23I is formed with a fourth insulation portion TI4 for shielding the top end of the second inner circular cylinder member 23.

In the present invention, a third recess 211 and a fourth recess 212 are respectively formed on the top side and the bottom side of the second insulation body 21, such that the second outer circular cylinder member 22 embedded in the second insulation body 21 protrudes out of the third recess 211 and the fourth recess 212 by the top end and the lower end thereof. The third molded circular cylinder member 22I also protrudes out of the third recess 211 and the fourth recess 212 by the top end and the lower end thereof. On the other hand, the second inner circular cylinder member 23 embedded in the second insulation body 21 is also located in the second outer circular cylinder member 22, so as to protrude out of the third recess 211 and the fourth recess 212 by the top end and the lower end thereof. The fifth molded circular cylinder member 23I also protrudes out of the third recess 211 and the fourth recess 212 by the top end and the lower end thereof. In addition, the second signal transmitting terminal 24 is also embedded in the second insulation body 21 and located in the second inner circular cylinder member 23, wherein the top end and the lower end of the second signal transmitting terminal 24 protrude out of the third recess 211 and the fourth recess 212, respectively.

There are a plurality of second through holes TH2 further provided in the third recess 211, wherein the second through holes TH2 are adopted for making the plurality of second signal transmitting members 25 pass through the third recess 211. Moreover, a plurality of second supporting members TS2 are provided in the third recess 211 for being adjacent to the plurality of second through holes TH2, respectively. By such arrangement, each of the plurality of second signal transmitting members 25 embedded in the second insulation body 21 protrudes out of the third recess 211 and the forth recess 212 of the second insulation body 21 by a second contact end 251 and a second insertion end 252 thereof. In addition, there are a plurality of embedding members CM provided in the third recess 211, wherein each of the plurality of embedding members CM is located between two of the plurality of second supporting members TS2. By such design, each of the plurality of embedding portions SF3 combines with each of the plurality of embedding members CM after the battery-end electrical connector 2 is connected with the space-end electrical connector 1.

On the other hand, the second PCB 26 is disposed in the fourth recess 212 of the second insulation body 21 so as to connected to second insertion ends 252 of the plurality of second signal transmitting members 25. Moreover, the second PCB 26 is further covered by an insulation plate 26a. It is worth noting that, there is a distributed circuit pattern CP formed on the second PCB 26, so as to make each two or more of the second signal transmitting members 25 electrically connect to each other through the distributed circuit pattern CP. FIG. 3 and FIG. 8 also depict that the plurality of second signal transmitting wires 27 are connected to the second PCB 26 by one end thereof, thereby electrically connecting to the plurality of second signal transmitting members 25, respectively.

FIG. 11 illustrates a side view of the battery-end electrical connector. From the present diagrams, it can find that the second negative electrode connecting unit 28 is one electrical extending member for the second outer circular cylinder member 22, and the second positive electrode connecting unit 29 is another one electrical extending member for the second inner circular cylinder member 23. According the particular design of the present invention, the second negative electrode connecting unit 18 comprises a third electrical connection member 282 and a third insulation member 281 covering the third electrical connection member 282. Moreover, the third electrical connection member 282 has a fifth connecting portion 2821 for connecting to the lower end of the second outer circular cylinder member 22 and a six connecting portion 2822 for connecting to the external device. On the other hand, the second positive electrode connecting unit 29 comprises a fourth electrical connection member 292 and a fourth insulation member 291 for covering the fourth electrical connection member 292. Moreover, the fourth electrical connection member 292 has a seventh connecting portion 2921 for connecting to the lower end of the second inner circular cylinder member 23 and an eighth connecting portion 2922 for connecting to the external device.

In addition, an insulation body fixing member IF2 having a plurality of flanges IF21 with a fixing hole is further connected to the second insulation body 21, so as to make the battery-end electrical connector 2 able to be easily attached onto an object such as the replaceable battery 3. For instance, FIG. 9 shows that the second positive electrode connecting unit 29 is disposed on the second negative electrode connecting unit 28 so as to be connected to the lower end of the second inner circular cylinder member 23. In this case, one supporting post SP2 is arranged between the fourth electrical connection member 292 and the insulation body fixing member IF2 as well as another one supporting post SP3 is arranged between the third electrical connection member 282 and the insulation body fixing member IF2 for maintaining the horizontal stability of the second positive electrode connecting unit 29.

Specialized Feature Elements Provided in the Electrical Connector Set with Multi Electrical-Connection Directionality First of the all specialized feature elements is the above described insulation portion. As FIG. 4 shows, the top end of the first molded circular cylinder member 12I is formed with a first insulation portion TI1 for shielding the top end of the first outer circular cylinder member 12, and the top end of the second molded circular cylinder member 13I is formed with a second insulation portion TI2 for shielding the top end of the first inner circular cylinder member 13. On the other hand, FIG. 8 depicts that, the top end of the fourth molded circular cylinder member 22I is formed with a third insulation portion TI3 for shielding the top end of the second outer circular cylinder member 22, and the top end of the fifth molded circular cylinder member 23I is formed with a fourth insulation portion TI4 for shielding the top end of the second inner circular cylinder member 23.

Second of the all specialized feature elements is water exhausting passages. As FIG. 4 shows, a plurality of first water exhausting passages WR1 are provided in the first recess 111 and connected to the inner wall of the first molded circular cylinder member 12I. Moreover, a plurality of second water exhausting passages WR2 are provided in the first recess 111 and connected to the inner wall of the circular protrusion block PB. On the other hand, a plurality of third water exhausting passages WR3 are provided in the one or more of the plurality of first supporting members TS1.

Third of the all specialized feature elements is waterproof element. As FIG. 4 shows, a waterproof pad WP1 is disposed at a connection junction between the insulation body fixing member IF1 and the first insulation body 11. On the other hand, as FIG. 8 shows, a waterproof pad WP2 is disposed at a connection junction between the insulation body fixing member IF2 and the second insulation body 21, and an inner waterproof ring OR is disposed in the third recess 211, and is also located at a connection junction of the inner wall of the third recess 211 and the plurality of second supporting members TS2.

Moreover, disposing the plurality of first signal transmitting members 15 in the space-end electrical connector 1 and the plurality of second signal transmitting members 25 in the battery-end electrical connector 2 are also one of the specialized features particularly provided in the electrical connector set ME. The multi first signal transmitting members 15 and second signal transmitting members 25 provided in the electrical connector set ME are adopted for being as extending or auxiliary signal terminals, such that the first signal transmitting terminal 14, the multi first signal transmitting members 15, the second signal transmitting terminal 24, and the second signal transmitting members 25 can be competent to the task of multi signal transmission and/or data transmission between a power management circuit disposed in the battery accommodating space 41 belong to an electric motorcycle or a self-replaceable battery charging station and a electricity charging controller unit provided in the replaceable battery 3. Briefly speaking, this electrical connector set ME is able to simultaneously finish the transmission of electricity, controlling signal and data signal between the replaceable battery 3 and the power management circuit.

Figure 1:
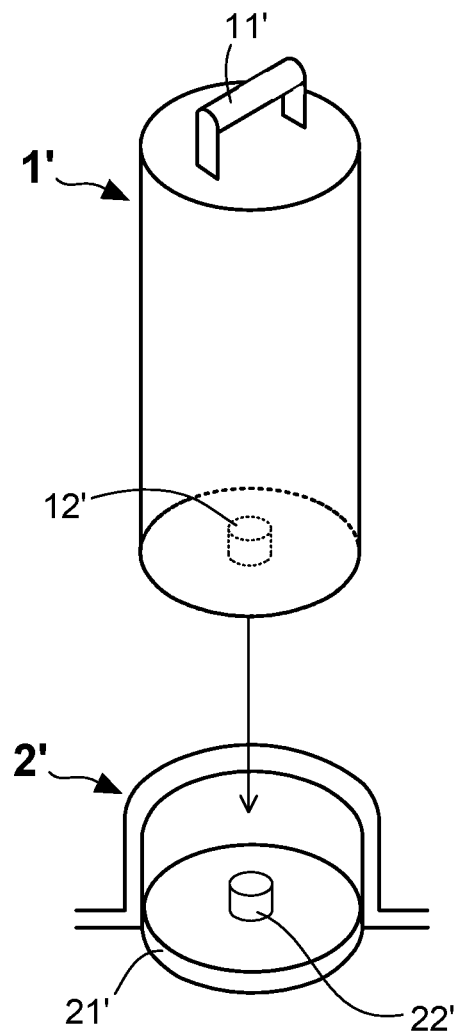
FIG. 1 shows a diagram for depicting a battery replacing operation in an electric motorcycle.

Therefore, through above descriptions, all embodiments and their constituting elements of the electrical connector set with multi electrical-connection directionality proposed by the present invention have been introduced completely and clearly; in summary, the present invention includes the advantages of:

(1) FIG. 1 has depicted that there is a limited or specific electrical-connection directionality existing between a battery-end electrical connector 11' of a motorcycle batteries 1' and a recess-end electrical connector 22' disposed in a battery accommodating space 2' due to the particular design of the electrical terminals of the two connectors, causing that the user cannot insert the motorcycle batteries 1' into the battery accommodating space 2' successfully by merely completing one-pass connection of the battery-end electrical connector 11' and the recess-end electrical connector 22'. In view of that, the present invention discloses an electrical connector set ME with multi electrical-connection directionality for use in electric vehicles, comprising a space-end electrical connector 1 disposed in a battery accommodating space 41 and a battery-end electrical connector 2 connected to a replaceable battery 3. Particularly, a first signal transmitting terminal 14 and a second signal transmitting terminal 24 are provided in the electrical connector set ME for being as two primary signal terminals, and there are multi first signal transmitting members 15 and second signal transmitting members 25 provided in the electrical connector set ME for being as extending or auxiliary signal terminals. It is worth particularly mentioning that, the space-end electrical connector 1 is integrated with a first outer circular cylinder member 12 and a first inner circular cylinder member 13 therein. In contrast to the space-end electrical connector 1, the battery-end electrical connector 2 is also provided with a second outer circular cylinder member 22 and a second inner circular cylinder member 23 therein. By such arrangement, after connecting the battery-end electrical connector 2 with the space-end electrical connector 1, the outer wall of the first outer circular cylinder member 12 contacts with a circular negative electrode NC of the second outer circular cylinder member 22, the outer wall of the first inner circular cylinder member 13 contacts with the circular positive electrode PC of the second inner circular cylinder member 23, and each of first contact ends 151 of the first signal transmitting members 15 contact with each of second contact ends 251 of the second signal transmitting members 25.

(2) Inheriting to above descriptions, it is noted that, the user can directly insert the replaceable battery 3 into the battery accommodating space 41 by completing one-pass connection of the battery-end electrical connector 2 and the space-end electrical connector 1, without needing to turn over or rotate the replaceable battery 3. One the other hand, the first signal transmitting terminal 14, the multi first signal transmitting members 15, the second signal transmitting terminal 24, and the second signal transmitting members 25 can be competent to the task of multi signal transmission and/or data transmission between a power management circuit disposed in the battery accommodating space 41 belong to an electric motorcycle or a self-replaceable battery charging station and a electricity charging controller unit provided in the replaceable battery 3. Briefly speaking, this electrical connector set ME is able to simultaneously finish the transmission of electricity, controlling signal and data signal between the replaceable battery 3 and the power management circuit.

The above description is made on embodiments of the present invention. However, the embodiments are not intended to limit scope of the present invention, and all equivalent implementations or alterations within the spirit of the present invention still fall within the scope of the present invention.

What is claimed is:

1. An electrical connector set (ME) with multi electrical-connection directionality, being applied between a replaceable battery (3) and a battery accommodating space (41), and comprising:
    a space-end electrical connector (1), being disposed in the battery accommodating space (41), and comprising:
        a first insulation body (11);
        a first outer circular cylinder member (12), being embedded in the first insulation body (11), and respectively protruding out of the top side and the bottom side of the first insulation body (11) by the top end and the lower end thereof;
        a first inner circular cylinder member (13), being embedded in the first insulation body (11) and locating in the first outer circular cylinder member (12), and respectively protruding out of the top side and the bottom side of the first insulation body (11) by the top end and the lower end thereof;
        a first signal transmitting terminal (14), being embedded in the first insulation body (11) and locating in the first inner circular cylinder member (13), and respectively protruding out of the top side and the bottom side of the first insulation body (11) by the top end and the lower end thereof;
        a plurality of first signal transmitting members (15), being embedded in the first insulation body (11) and having a first contact end (151) and a first insertion end (152); wherein the first contact end (151) and the first insertion end (152) protrude out of the top side and the bottom side of the first insulation body (11), respectively;
        a first PCB (16), being connected to the first insertion ends (152) of the plurality of first signal transmitting members (15) through the bottom side of the first insulation body (11); and
        a plurality of first signal transmitting wires (17), being connected to the first PCB (16) by one end thereof, thereby electrically connecting to the plurality of first signal transmitting members (15), respectively; and
    a battery-end electrical connector (2), being connected to the replaceable battery (3), and comprising:
        a second insulation body (21);
        a second outer circular cylinder member (22), being embedded in the second insulation body (21) and provided with a circular negative electrode (NC) on the inner wall thereof, and respectively protruding out of the top side and the bottom side of the second insulation body (21) by the top end and the lower end thereof;
        a second inner circular cylinder member (23), being embedded in the second insulation body (21) and locating in the second outer circular cylinder member (22); wherein the inner circular cylinder member (23) is provided with a circular positive electrode (PC) on the inner wall thereof, and respectively protruding out of the top side and the bottom side of the second insulation body (21) by the top end and the lower end thereof;
        a second signal transmitting terminal (24), being disposed in the second positive electrode supporting member (23), and respectively protruding out of the top side and the bottom side of the second insulation body (21) by the top end and the lower end thereof;
        a plurality of second signal transmitting members (25), being embedded in the second insulation body (21) and having a second contact end (251) and a second insertion end (252); wherein the second contact end (251) and the second insertion end (252) protrude out of the top side and the bottom side of the second insulation body (21), respectively;
        a second PCB (26), being connected to the second insertion ends (252) of the plurality of second signal transmitting members (25) through the bottom side of the second insulation body (21); and
        a plurality of second signal transmitting wires (27), being connected to the second PCB (26) by one end thereof, thereby electrically connecting to the plurality of second signal transmitting members (25), respectively;
    wherein by connecting the battery-end electrical connector (2) with the space-end electrical connector (1), the outer wall of the first outer circular cylinder member (12) contacting with the circular negative electrode (NC) of the second outer circular cylinder member (22), the outer wall of the first inner circular cylinder member (13) contacting with the circular positive electrode (PC) of the second inner circular cylinder member (23), and each of the first contact ends (151) of the plurality of first signal transmitting members (15) contacting with each of the second contact ends (251) of the plurality of second signal transmitting members (25).

2. The electrical connector set of claim 1, wherein a first recess (111) and a second recess (112) are respectively formed on the top side and the bottom side of the first insulation body (11), and a third recess (211) and a fourth recess (212) being respectively formed on the top side and the bottom side of the second insulation body (21).

3. The electrical connector set of claim 1, wherein there is a distributed circuit pattern (CP) formed on the first PCB (16), so as to make each two or more of the first signal transmitting members (15) electrically connect to each other through the distributed circuit pattern (CP).

4. The electrical connector set of claim 1, wherein there is a distributed circuit pattern (CP) formed on the second PCB (26), so as to make each two or more of the second signal transmitting members (25) electrically connect to each other through the distributed circuit pattern (CP).

5. The electrical connector set of claim 1, wherein the space-end electrical connector (1) further comprises:
an insulation body fixing member (IF1) connected to the first insulation body (11), having a plurality of flanges (IF11) with a fixing hole; and
a waterproof pad (WP1), being disposed at a connection junction between the insulation body fixing member (IF1) and the first insulation body (11).

6. The electrical connector set of claim 1, wherein each of the first outer circular cylinder member (12), the first inner circular cylinder member (13), the second outer circular cylinder member (22), and the second inner circular cylinder member (23) has a plurality of molding injection passages.

7. The electrical connector set of claim 2, wherein the first PCB (16) is disposed in the second recess (112) of the first insulation body (11) and further covered by an insulation plate (16a).

8. The electrical connector set of claim 2, wherein the second PCB (17) is disposed in the fourth recess (212) of the second insulation body (21) and further covered by an insulation plate (26a).

9. The electrical connector set of claim 2, wherein the first insulation body (11) further comprises:
a first molded circular cylinder member (12I), being disposed in the first outer circular cylinder member (12) so as to support the inner wall of the first outer circular cylinder member (12); wherein the first molded circular cylinder member (12I) protrudes out of the first recess (111) and the second recess (112) of the first insulation body (11) by the top end and the lower end thereof, respectively; and wherein the top end of the first molded circular cylinder member (12I) is formed with a first insulation portion (TI1) for shielding the top end of the first outer circular cylinder member (12);
a second molded circular cylinder member (13I), being disposed in the first inner circular cylinder member (13) so as to support the inner wall of the first outer circular cylinder member (13); wherein the second molded circular cylinder member (13I) protrudes out of the first recess (111) and the second recess (112) by the top end and the lower end thereof, respectively; and wherein the top end of the second molded circular cylinder member (13I) is formed with a second insulation portion (T12) for shielding the top end of the first inner circular cylinder member (13); and
a third molded circular cylinder member (14I), being disposed in the second molded circular cylinder member (13I); wherein the first signal transmitting terminal (14) is located in the third molded circular cylinder member (14I), and the third molded circular cylinder member (14I) protruding out of the first recess (111) and the second recess (112) by the top end and the lower end thereof, respectively.

10. The electrical connector set of claim 9, further comprising:
a plurality of first through holes (TH1) provided in the first recess (111), being adopted for making the plurality of first signal transmitting members (15) pass through the first recess (111);
a plurality of first supporting members (TS1), being provided in the first recess (111), and being adjacent to the plurality of first through holes (TH1), respectively;
a circular protrusion block (PB), being provided in the first recess (111); and
a plurality of second through holes (TH2) provided in the second recess (211), being adopted for making the plurality of second signal transmitting members (25) pass through the second recess (211) through the plurality of second through holes (TH2).

11. The electrical connector set of claim 9, wherein the second insulation body (21) further comprises:
a fourth molded circular cylinder member (22I), being disposed in the second outer circular cylinder member (22) so as to support the inner wall of the second outer circular cylinder member (22); wherein the fourth molded circular cylinder member (22I) protrudes out of the third recess (211) and the fourth recess (212) of the second insulation body (21) by the top end and the lower end thereof, respectively; and wherein the top end of the fourth molded circular cylinder member (22I) is formed with a third insulation portion (TI3) for shielding the top end of the second outer circular cylinder member (22);
a fifth molded circular cylinder member (23I), being disposed in the second inner circular cylinder member (23) so as to support the inner wall of the second outer circular cylinder member (23); wherein the fifth molded circular cylinder member (23I) protrudes out of the third recess (211) and the fourth recess (212) by the top end and the lower end thereof, respectively; and wherein the top end of the fifth molded circular cylinder member (23I) is formed with a fourth insulation portion (114) for shielding the top end of the second inner circular cylinder member (23);
a sixth molded circular cylinder member (24I), being disposed in the fifth molded circular cylinder member (23I); wherein the second signal transmitting terminal (24) is located in the sixth molded circular cylinder member (24I), and the sixth molded circular cylinder member (24I) protruding out of the third recess (211) and the fourth recess (212) by the top end and the lower end thereof, respectively.

12. The electrical connector set of claim 10, wherein there are a plurality of second supporting members (TS2) provided in the third recess (211), and the plurality of second supporting members (TS2) being adjacent to the plurality of second through holes (THS2), respectively.

13. The electrical connector set of claim 10, wherein the first insulation body (11) further comprises:
a plurality of first water exhausting passages (WR1), being provided in the first recess (111) and connected to the inner wall of the first molded circular cylinder member (12I);
a plurality of second water exhausting passages (WR2), being provided in the first recess (111) and connected to the inner wall of the circular protrusion block (PB); and
a plurality of third water exhausting passages (WR3), being provided in the one or more of the plurality of first supporting members (TS2).

14. The electrical connector set of claim 10, wherein the space-end electrical connector (1) further comprises a supporting frame (SF), comprising:
a frame (SF1), being disposed in the first recess (111) and located between the plurality of first supporting members (TS1) and the plurality of first through holes (TH1); wherein the frame (SF1) is also located between the plurality of first supporting members (TS1) and the circular protrusion block (PB);

a plurality of supporting portions (SF2), being formed on the frame (SF1), and being used for supporting the plurality of first signal transmitting members (15), respectively;

a plurality of embedding portions (SF3), being formed on the frame (SF1); wherein each of the plurality of embedding portions (SF3) is located between two of the supporting portions (SF2); and a plurality of fixing portions (SF4), being formed on the frame (SF1), and being adopted for fixing the frame (SF1) in the first recess (111) in combination with a plurality of screwing members.

15. The electrical connector set of claim 12, wherein the battery-end electrical connector (2) further comprises a supporting frame (SF), comprising:

an insulation body fixing member (IF2) connected to the second insulation body (21), having a plurality of flanges (IF21) with a fixing hole;

a waterproof pad (WP2), being disposed at a connection junction between the insulation body fixing member (IF2) and the second insulation body (21); and an inner waterproof ring (OR), being disposed in the third recess (211), and being located at a connection junction of the inner wall of the third recess (211) and the plurality of second supporting members (TS2).

16. The electrical connector set of claim 14, wherein there are a plurality of embedding members (CM) provided in the third recess (211), and each of the plurality of embedding members (CM) being located between two of the plurality of second supporting members (TS2); and wherein each of the plurality of embedding portions (SF3) combines with each of the plurality of embedding members (CM) after the battery-end electrical connector (2) is connected with the space-end electrical connector (1).

17. The electrical connector set of claim 1, further comprising:

a first negative electrode connecting unit (18), comprising:

a first electrical connection member (182), having a first connecting portion (1821) for connecting to the lower end of the first outer circular cylinder member (12) and a second connecting portion (1822) for connecting to an external device; and a first insulation member (181) covering the first electrical connection member (182); and a first positive electrode connecting unit (19), comprising:

a second electrical connection member (192), having a third connecting portion (1921) for connecting to the lower end of the first inner circular cylinder member (13) and a fourth connecting portion (1922) for connecting to the external device; and a second insulation member (191) covering the second electrical connection member (192).

18. The electrical connector set of claim 17, further comprising:

a second negative electrode connecting unit (28), comprising:

a third electrical connection member (282), having a fifth connecting portion (2821) for connecting to the lower end of the second outer circular cylinder member (22) and a six connecting portion (2822) for connecting to the external device; and a third insulation member (281) covering the third electrical connection member (282); and a second positive electrode connecting unit (29), comprising:

a fourth electrical connection member (292), having a seventh connecting portion (2921) for connecting to the lower end of the second inner circular cylinder member (23) and an eighth connecting portion (2922) for connecting to the external device; and a fourth insulation member (291) covering the fourth electrical connection member (292).

* * * * *